United States Patent [19]

Cwirzen

[11] Patent Number: 4,626,955

[45] Date of Patent: Dec. 2, 1986

[54] THREE ELECTRODE GAS TUBE PROTECTOR

[75] Inventor: Casimir Z. Cwirzen, Arlington Heights, Ill.

[73] Assignee: Northern Telecom Limited, Montreal, Canada

[21] Appl. No.: 714,501

[22] Filed: Mar. 21, 1985

[51] Int. Cl.[4] .................... H02H 3/22

[52] U.S. Cl. .................... 361/119; 361/124; 361/129; 337/29

[58] Field of Search .................... 361/117-120, 361/124, 130, 129; 337/28, 29, 32-34; 179/91 R, 98

[56] References Cited

U.S. PATENT DOCUMENTS 4,015,228 3/1977 Eda et al. .................... 361/124 X
4,056,840 11/1977 Lundsgaard et al. .................... 361/124
4,074,337 2/1978 Debortoli et al. .................... 337/32 X

*Primary Examiner*—A. D. Pellinen
*Assistant Examiner*—T. DeBoer
*Attorney, Agent, or Firm*—Schwartz, Jeffery, Schwaab, Mack, Blumenthal & Evans

[57] ABSTRACT

A three electrode gas tube protector has a central electrode and a line electrode positioned on each side, with a gap between each line electrode and the central electrode, the gaps being at a subatmospheric pressure. Connecting to each line electrode, in an axial arrangement, is a ground assembly having two coaxial conductive cups, their bottom ends spaced by a fusible member. A contact member is positioned within the inner cup and has a head and a stem. Around the stem is a compression spring, the stem passing through the bottoms of the cups and the fusible member. The end of the stem extends over the outer surface of the outer cup bottom, as by riveting. The spring is constrained between the bottom of the inner cup and the head of the contact member. On melting of the fusible member, the inner cup moves axially in the outer cup and a radially extending member, such as a flange or other, moves into contact with a ground member in a support structure.

10 Claims, 5 Drawing Figures

THREE ELECTRODE GAS TUBE PROTECTOR

This invention relates to three electrode gas tube protectors in which a spark gap is provided on either side of a central electrode by further electrodes in opposition to and spaced from the central electrode. In particular, the invention is concerned with such a protector in which a heat sensitive element, such as a fusible slug, is associated with each outer electrode. Fusion of a slug occurs when temperature of the associated electrodes rises above a predetermined value and connects the telephone line to ground.

Generally, the heat sensitive elements are provided as separate items, which can cause assembly problems, or are positioned in cups which in turn are positioned one on each end of the gas tube. Fusing of the element alters the overall length of the protector. This can be acceptable in some instances, but in other instances it is necessary for the overall length of the protector to remain constant to maintain contact with the lines to be protected.

The present invention provides a three electrode gas tube protector having a central electrode, a line electrode positioned on each side of the central electrode and being spaced therefrom to define a spark gap on either side of the central electrode. The line electrodes are connected to the central electrode by ceramic or other electrically insulating tubular members in a sealed condition. A conductive outer cup is provided extending axially from each line electrode, the bottom of the cup in contact with the line electrode. Within the outer cup is an inner cup, its closed end adjacent to and connected to the closed end of the outer cup, the connection being by a disc of fusible alloy positioned between the closed ends. The inner cup has a radially outward extending flange at its open end. A compression spring is positioned within the inner cup. A contact member holds the compression spring under load, the contact member comprising a central stem passing axially through the spring and through the closed ends of both cups and the disc of fusible alloy, the stem rivetted over onto the outside of the closed end of the outer cup. At the outer end of the stem is an enlarged head, a sliding fit in the inner cup.

The invention will be readily understood by the following description of an embodiment by way of example, in conjunction with the accompanying drawings, in which.

Figure 1:
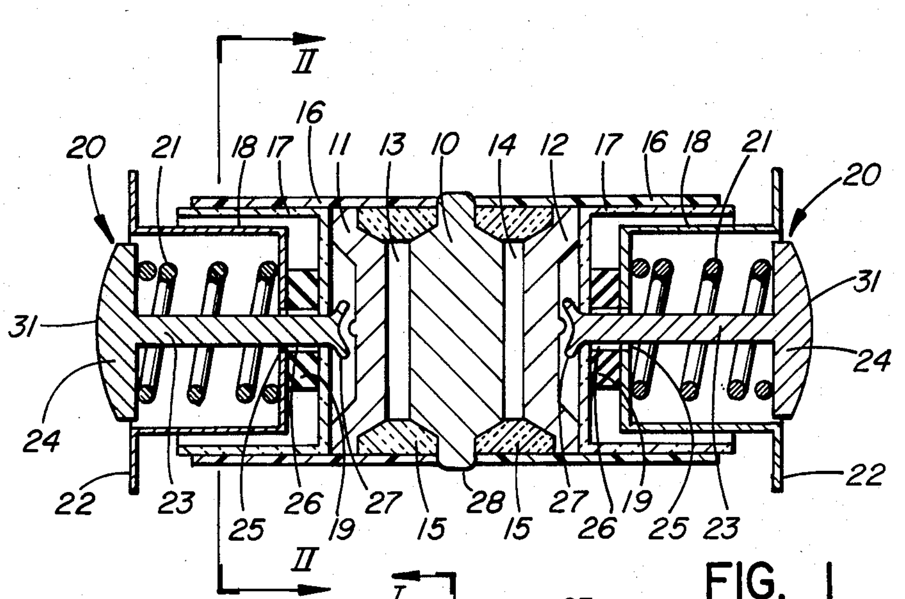
FIG. 1 is a longitudinal cross-section through a protector, on the line I—I of FIG. 2.

As illustrated in FIG. 1, the protector has a central electrode 10, on either side of which are positioned line electrodes 11 and 12. The line electrodes are spaced from the central electrode to define gaps 13 and 14. The line electrodes and central electrode are joined together in a gas-tight sealed assembly by ceramic rings 15. The central electrode extends radially a small distance beyond the periphery of the ceramic rings and line electrodes. The gaps 13 and 14 are at a sub-atmospheric pressure and break down at a predetermined voltage.

Extending on each side of the central electrode 10 is a plastic tube 16. Within each tube is mounted a further assembly comprising an outer metal cup 17, an inner metal cup 18, a fusible disc 19, a contact member 20 and a compression spring 21. The outer cup 17 is a fairly tight fit in the plastic tube 16, which is also a fairly tight fit on the line electrode and ceramic ring. The closed bottom of the outer cup is in contact with the related line electrode 11 or 12. The inner cup is a loose sliding fit in the outer cup and between the outside of the closed bottom of the inner cup and the inside of the closed bottom of the outer cup is positioned the fusible disc 19. At its outer end, the inner cup has a radially outwardly extending flange 22. Through the inner and outer cups, and the fusible disc, extends the contact member 20. Contact member 20 has a stem portion 23 and a relatively large disc-like head portion 24. The head portion is a loose sliding fit in the inner cup 18 and acts as the outer abutment for the compression spring 21. The stem portion passes through the spring, through a hole 25 in the bottom of the inner cup, through a hole 26 in the fusible disc and through the bottom of the outer cup, being rivetted over on the outside of the bottom of the outer cup, at 27. The hole 25 in the inner cup is somewhat larger than the stem portion to permit easy sliding of the inner cup on the stem member.

The protector is held together as an assembly by the plastic tubes 16, which also act as electrical insulators around the line electrodes 11 and 12 and the outer cups 17. The central electrode 10 extends radially from between the opposed ends of the tubes 16 and is the ground electrode, contact being made with the peripheral surface 28. In use, for example as illustrated in FIG. 4, line terminals or contact members make contact with the end surface 31 of the head portions 24 of contact members 20.

The arrangement is such that on an occurrence of a voltage above a predetermined value, on a line conductor, the related gap 13 or 14 breaks down with a spark discharge between the line electrode and the central or ground electrode. If the overvoltage continues, then the line electrode, and the ground electrode, heats up and eventually the fusible disc 19 melts. This permits the spring 21 to move the inner cup 18 axially within the outer cup 17. The flange 22 then contacts a support and ground member. A permanent connection to ground then exists and the protector must be replaced before service can be restored. Instead of a flange 22, a radially extending member, or members, can be provided.

Figure 2:
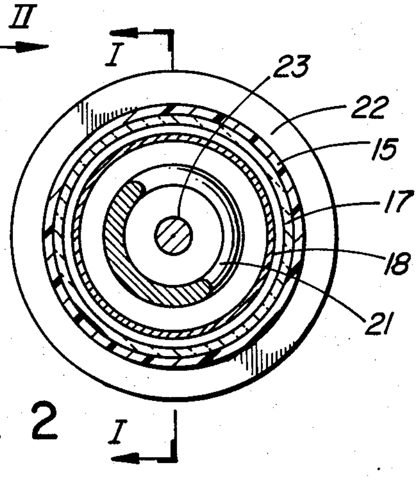
FIG. 2 is a cross-section on the line II—II of FIG. 1.
Figure 3:
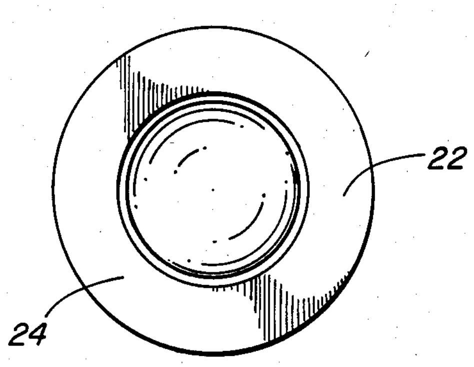
FIG. 3 is an end view.
Figure 4:
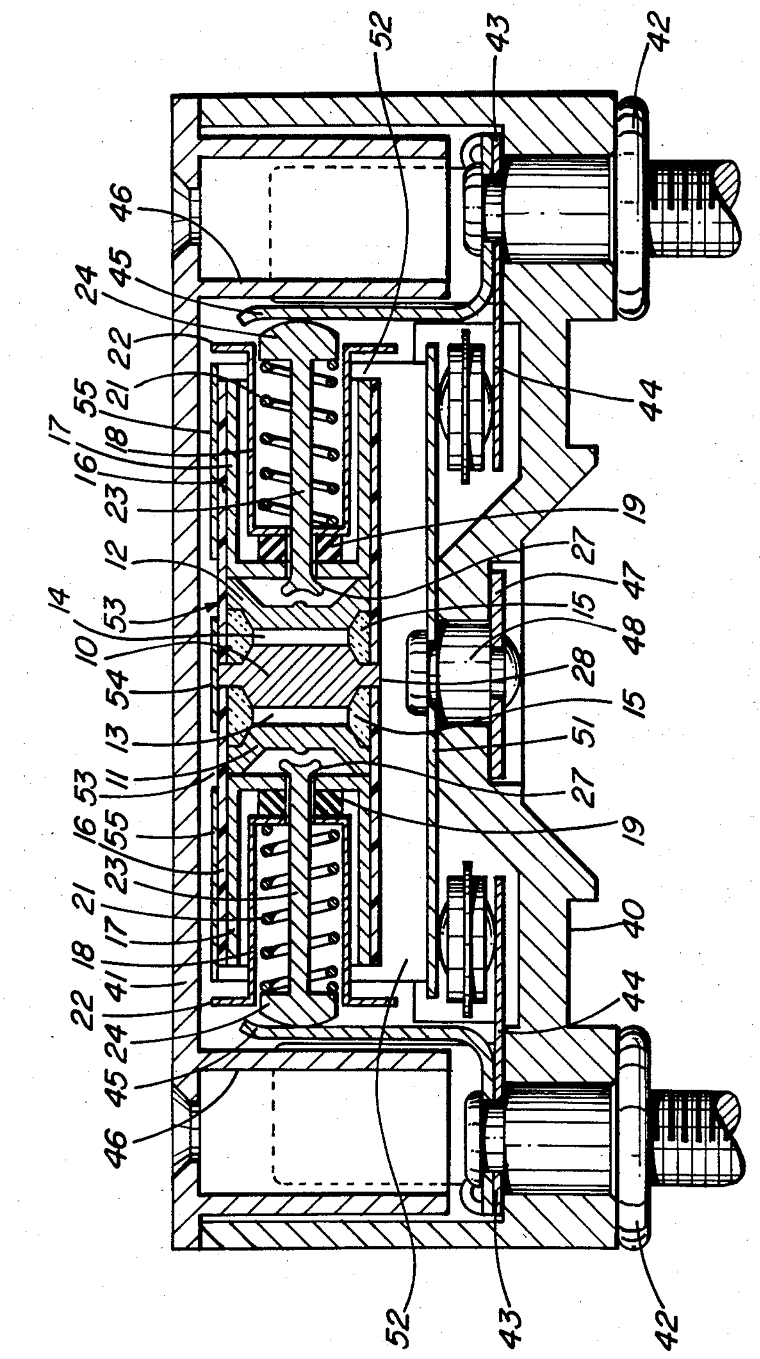
FIG. 4 is a cross-section, as FIG. 1, but of a protector in a housing.
Figure 5:
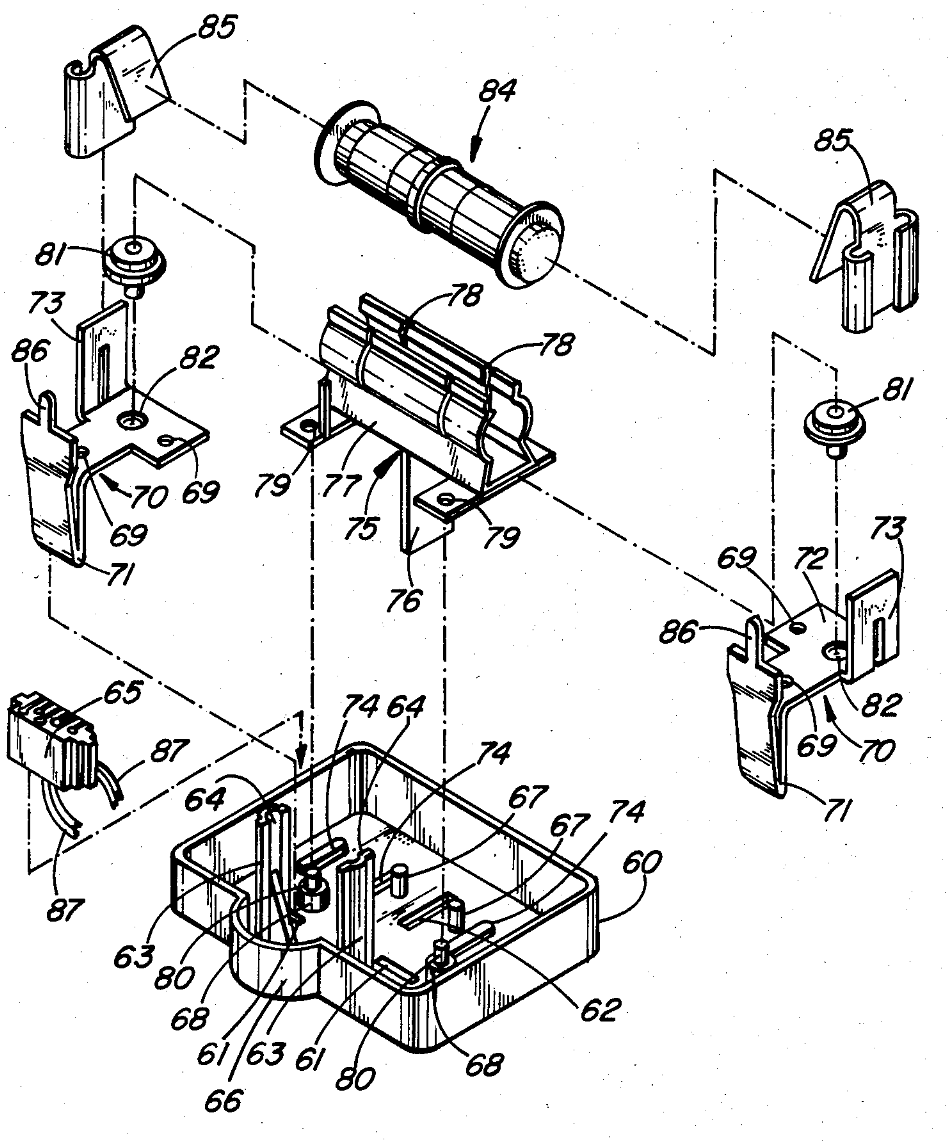
FIG. 5 is an exploded perspective of a protector as in FIG. 1 in an alternative form of housing.

FIG. 4 illustrates a protector as illustrated in FIGS. 1, 2 and 3 installed in a protector module. The module comprises two housings, a bottom housing 40 and a top housing 41. In the example, top housing 41 fits inside the bottom housing 40. At each end of the bottom housing a line terminal 42 extends through an aperture and is attached to a line contact member 43. Each line contact member is in the form of a Tee with the cross-bar 44 resting on the bottom wall of the bottom housing. The leg 45 extends upward spaced a short distance inside of a tubular structure 46 extending down from the top wall of the top housing. At a central position a ground terminal 47 is attached by a rivet 48 passing through the bottom wall of the bottom housing and fastened to a support and ground member 50. The support and ground member has a flat base 51 and arcuate walls 52, extending upward. The walls define a generally cylindrical position. The walls are divided into three sections by slots 53, to give a central section 54 and end sections 55. A similar support member is illustrated in FIG. 5.

A three electrode gas tube protector asembly snaps into the support and ground member. The central section of the support and ground member makes contact with a central electrode of the gas tube protector. The end surfaces 31 of the head portions 24 of the contact members 20 are in contact with the line contact members 43 via the legs 45. The legs 45 are biased inward and are deflected outward on insertion of the gas tube protector assembly. Center section 54 of the support and ground member makes contact with the periphery of the central electrode 10. On melting of the fusible disc 19, the inner cup 18 moves to bring the flange 22 into contact with the end surface of the support and ground member 50.

With gas tube protector devices, each gap is usually at a sub-atmospheric pressure, with the electrodes sealed to the ceramic rings. If the seal breaks, the gaps become vented to atmosphere and the breakdown voltage rises to an unacceptable value. To provide some protection in such circumstances, a back-up gap device is provided. In the example illustrated in FIG. 4, a back-up device is provided for each line and are indicated at 60.

The back-up gap devices at 60 each comprise two electrodes 61 and 62 separated by and bonded to a disc 63 of insulating material. The disc has a central hole which defines a gap between the electrodes. The gap is arranged to break down at a voltage which is slightly higher than the breakdown voltage of the gaps 13 and 14. The back-up devices are held between the cross bars 44 of the line contact members 43 and the bottom 51 of the support and ground member 50.

The protector as illustrated in FIGS. 1, 2 and 3 can also be used in an interface module, as described in application Ser. No. 630,880, filed July 13, 1984, in the names of the present assignee.

FIG. 5, an exploded perspective view of an interface module as illustrated in the above referenced application, also shows a protector as in FIGS. 1, 2 and 3. The module has a base 60, which combines with a top, not shown, to form an enclosure. In the base are two slots 61 for line terminals and a slot 62 for a ground terminal. Two pillars 63 extend up from the inner bottom surface of the base, the pillars having opposed grooves 64 in which slides a contact member 65 for a modular jack. The base has an arcuate portion 66 at the jack position. Mounting posts 67, 68 extend up from the bottom surface for mounting and positioning of terminals in the housing.

Two line terminals are shown at 70. Each line terminal has a blade portion 71 which extends down through a slot 61. At the top of the blade portion an L-shaped portion extends, comprising a support portion 72 extending generally normal to the blade portion, and a contact portion 73 extending normal to the support portion. In position, the support portions 72 rest on ribs 74 on the bottom surface of the base 60, holes 69 allowing passage of the posts 67 and 68. The contact portions are adjacent the ends of the base, with the support portions extending towards each other.

A ground terminal member 75 has a blade portion 76 which extends through slot 62 and a tubular protector holding portion 77 which is divided into three portions by slits 78. In position, the protector holding portion rests on top of the posts 67, and is located by holes 79 which fit over top portions 80 of the posts 68, the portions 80 being of smaller diameter than the lower parts of the posts. This maintains a gap between the portion 77 of the ground terminal member 75 and the line terminals 70.

Positioned between the support portions 72 of the line terminals and the protector holding portion 77 of the ground terminal are back-up protectors 81. The protectors rest in recesses 82 formed in the support portions 72. Positioned in the tubular protector holding portion 77 of the ground terminal 75 is a protector, indicated at 84, as illustrated in FIGS. 1, 2 and 3. To provide some contact resilience, spring contact members 85 are positioned on the contact portions 73 of the line terminals 70. The disc-like head portions 24 (FIG. 1) make contact with the spring contact members 85.

The central electrode 10 of the protector 84 makes contact with the protector holding portion 77 of the ground terminal 75. The metal cups 17 are insulated from the protector holding portion 77 by the plastic tubes 16. Tabs 86 on the line terminals 70 provide for connection of line conductors 87 from the contact member 65.

In operation, direct connection exists between incoming lines, to which the blade portions 71 of the line terminals are connected, and the customers' equipment connected by a plug in the jack, via the tabs 86 and conductors 87. On occurrence of an overvoltage, there is a breakdown in the protector 84 to ground. If protector 84 becomes faulty, as by leakage, resulting in an unacceptably high breakdown voltage characteristic, then the back-up protectors 81 will break down at a slightly higher voltage than that of protector 84 when in operating condition.

What is claimed is:

1. A three electrode gas tube protector comprising;

a central electrode and a line electrode positioned on each side of the central electrode and spaced from the central electrode to define two gaps having a predetermined voltage breakdown, the electrodes forming a sealed assembly with said gaps at a sub-atmospheric pressure;

a conductive outer cup extending axially from each line electrode and a conductive inner cup within each outer cup, the bottom of the outer cup in contact with the line electrtode, the inner end of the inner cup spaced from the bottom end of the outer cup, the inner cup having a radially extending member at its outer end, the member spaced axially from the outer cup, and a fusible member positioned between and in contact with the inner end of the inner cup and the bottom end of the outer cup;

a compression spring positioned within said inner cup and a contact member having a head portion and a stem portion, the stem portion extending axially through said spring and said inner end of said inner cup and said bottom of said outer cup, the stem portion having an inner end extending over the outer surface of the bottom of the outer cup, the spring contained in compression between said head portion and said inner end of the inner cup, said head portion extending axially beyond said radially extending member;

the arrangement such that on melting of the fusible element, said inner cup is moved axially by the spring for said flange to contact a ground member.

2. A protector as claimed in claim 1, including a ceramic ring between each line electrode and said central electrode, said ceramic rings sealed to the electrodes and defining, with said electrodes, said gaps.

3. A protector as claimed in claim 1, including a circular central electrode and circular line electrodes and a ceramic ring sealed between each line electrode and the central electrode.

4. A protector as claimed in claim 3, said line electrodes and said ceramic rings having substantially equal outside diameters, and an insulating sleeve positioned over each outer cup and extending axially over the related line electrode and ceramic ring, said central electrode extending radially beyond the outside surface of the insulating sleeves.

5. A protector as claimed in claim 1, said fusible member being a ring and said stem portion passing through said fusible member.

6. A protector as claimed in claim 4, each insulating sleeve comprising a plastic tube.

7. A protector as claimed in claim 1, said radially extending member comprising a flange.

8. A three electrode gas tube protector comprising an electrode assembly and a grounding assembly positioned on each side of the electrode assembly, in an axial arrangement;

said electrode assembly comprising a disc-like central electrode, two disc-like line electrodes positioned one on each side of the electrode, and a ceramic ring positioned between and sealed to the central electrode and each line electrode and defining, with the electrodes, a gap between each line electrode and the central electrode, the gaps being at subatmospheric pressure;

each of said ground assemblies comprising; an outer metal cup; an inner metal cup positioned within and moveable axially in the outer cup; each cup having a closed bottom and the inner cup having a radially extending member at its open end; a fusible member positioned on the bottoms of the cups; a compression spring positioned within the inner cup; a contact member within said inner cup and having a head portion and a stem portion, the stem portion extending through the spring, the bottoms of the cups and the fusible member and extending over the outer surface of the bottom of the outer cup; the spring being constrained between the bottom of the inner cup and the head portion of the contact member, the head portion extending axially beyond said radially extending member;

a plastic tube in close contact with and extending axially over each ground assembly and the related line electrode, the bottom ends of the outer cups adapted to be in contact with a line electrode.

9. A protector as claimed in claim 8, said central electrode having a peripheral surface extending radially beyond the peripheries of the plastic tubes.

10. A protector as claimed in claim 8, said radially extending member comprising a flange.

* * * * *